United States Patent
Hanshaw

(10) Patent No.: US 9,027,841 B2
(45) Date of Patent: May 12, 2015

(54) COIN WITH EMBEDDED MICRO-CHIP

(71) Applicant: Gray Water Ops, LLC, Harrisburg, PA (US)

(72) Inventor: Keith A. Hanshaw, Ocean Pines, MD (US)

(73) Assignee: Gray Water Ops, LLC, New Cumberland, PA (US)

( * ) Notice: Subject to any disclaimer, the term of this patent is extended or adjusted under 35 U.S.C. 154(b) by 0 days.

(21) Appl. No.: 14/139,131

(22) Filed: Dec. 23, 2013

(65) Prior Publication Data

US 2014/0183268 A1    Jul. 3, 2014

Related U.S. Application Data

(60) Provisional application No. 61/746,425, filed on Dec. 27, 2012.

(51) Int. Cl.
*G06K 19/06* (2006.01)
*G06K 19/04* (2006.01)

(52) U.S. Cl.
CPC .................. *G06K 19/047* (2013.01)

(58) Field of Classification Search
USPC .............................. 235/492, 375, 383; 463/25
See application file for complete search history.

(56) References Cited

U.S. PATENT DOCUMENTS

| 7,182,901 | B2* | 2/2007 | Tseng et al. | 264/296 |
|---|---|---|---|---|
| 7,931,204 | B2* | 4/2011 | Chapet | 235/492 |
| 8,665,094 | B2* | 3/2014 | Lee | 340/572.7 |
| 2002/0006829 | A1* | 1/2002 | Purton | 463/47 |
| 2006/0273181 | A1* | 12/2006 | Charlier et al. | 235/492 |
| 2013/0062156 | A1* | 3/2013 | Chandaria | 194/339 |

* cited by examiner

*Primary Examiner* — Ahshik Kim

(57) ABSTRACT

A digital information transferring coin is a disc-shaped apparatus that is capable of transferring digital information to another electronic device through radio communication. The apparatus includes a metal planar body, a near field communication (NFC) chip, a vinyl sticker, and an insulative pad. The NFC chip is mounted within a recessed well of the metal planar body. The vinyl sticker encloses the NFC chip within the recessed well, which allows the NFC chip to wirelessly communicate with a host NFC-enabled electronic device without interference from the apparatus. The NFC chip is situated within its recessed well with the insulative pad, which is used to prevent the NFC chip from making direct contact with the metal planar body. An epoxy finish is applied onto both the vinyl sticker and the metal planar body in order to further protect the NFC chip from any physical damage.

11 Claims, 4 Drawing Sheets

COIN WITH EMBEDDED MICRO-CHIP

The current application claims a priority to the U.S. Provisional Patent application Ser. No. 61/746,425 filed on Dec. 27, 2012.

FIELD OF THE INVENTION

The present invention relates generally to an apparatus for coin. More specifically, the present invention is a custom minted coin with micro-chip embedded in the coin that allows a user to communicate information by using Near Field Communication (NFC).

BACKGROUND OF THE INVENTION

Typically, custom coins comprise a photographic insert within a custom minted coin that is offset printed onto a thin, iron-based metal disc and is inserted into the center of the coin. Epoxy is applied over the insert in order to seal the insert into the coin design. The problem with this configuration is that the metal disc, on which the photograph is printed on, blocks the transmission of digital data from the coin to a smart-phone or other NFC reader, and, thus, making the coin unable to function as described. The present invention uses NFC technology in the form of a custom minted coin that can exchange business information through radio communication with another electronic device. The present invention can also be used as a digital portfolio/resume, a means to store personal contact information, a means to store a link to a website, a means to store a unique customer identification for reward/loyalty points, a means to track time and attendance, a means for physical access, a means for secure computing access, or a means for cashless payments.

DETAILED DESCRIPTIONS OF THE INVENTION

All illustrations of the drawings are for the purpose of describing selected versions of the present invention and are not intended to limit the scope of the present invention.

Figure 1:
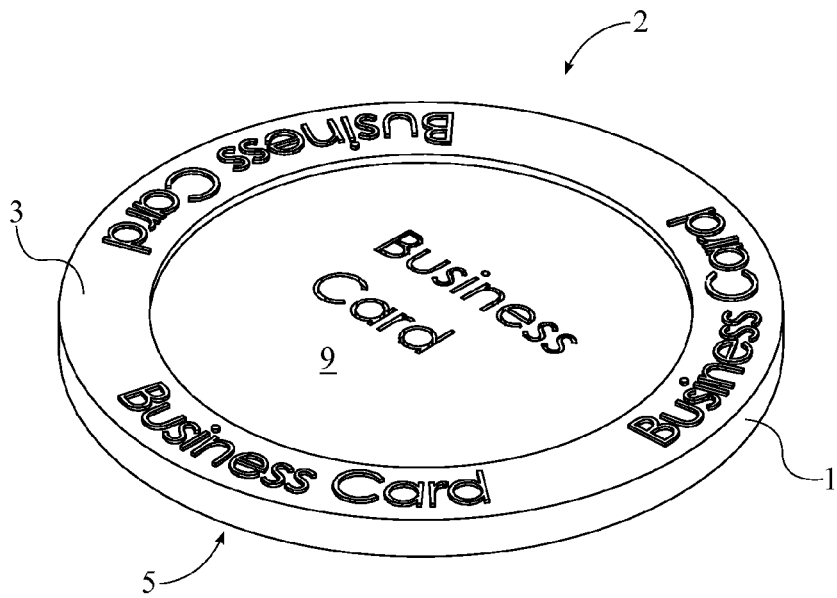
FIG. 1 is a top perspective view of the present invention in an assembled configuration.
Figure 2:
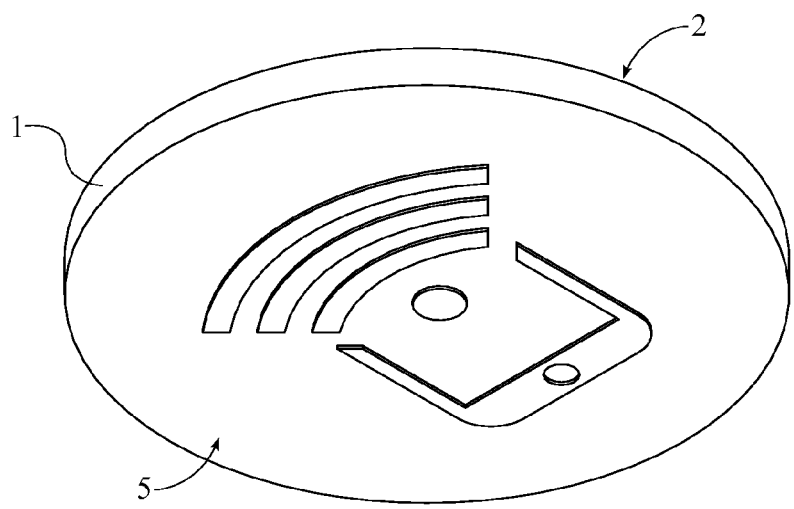
FIG. 2 is a bottom perspective view of the present invention in an assembled configuration.
Figure 3:
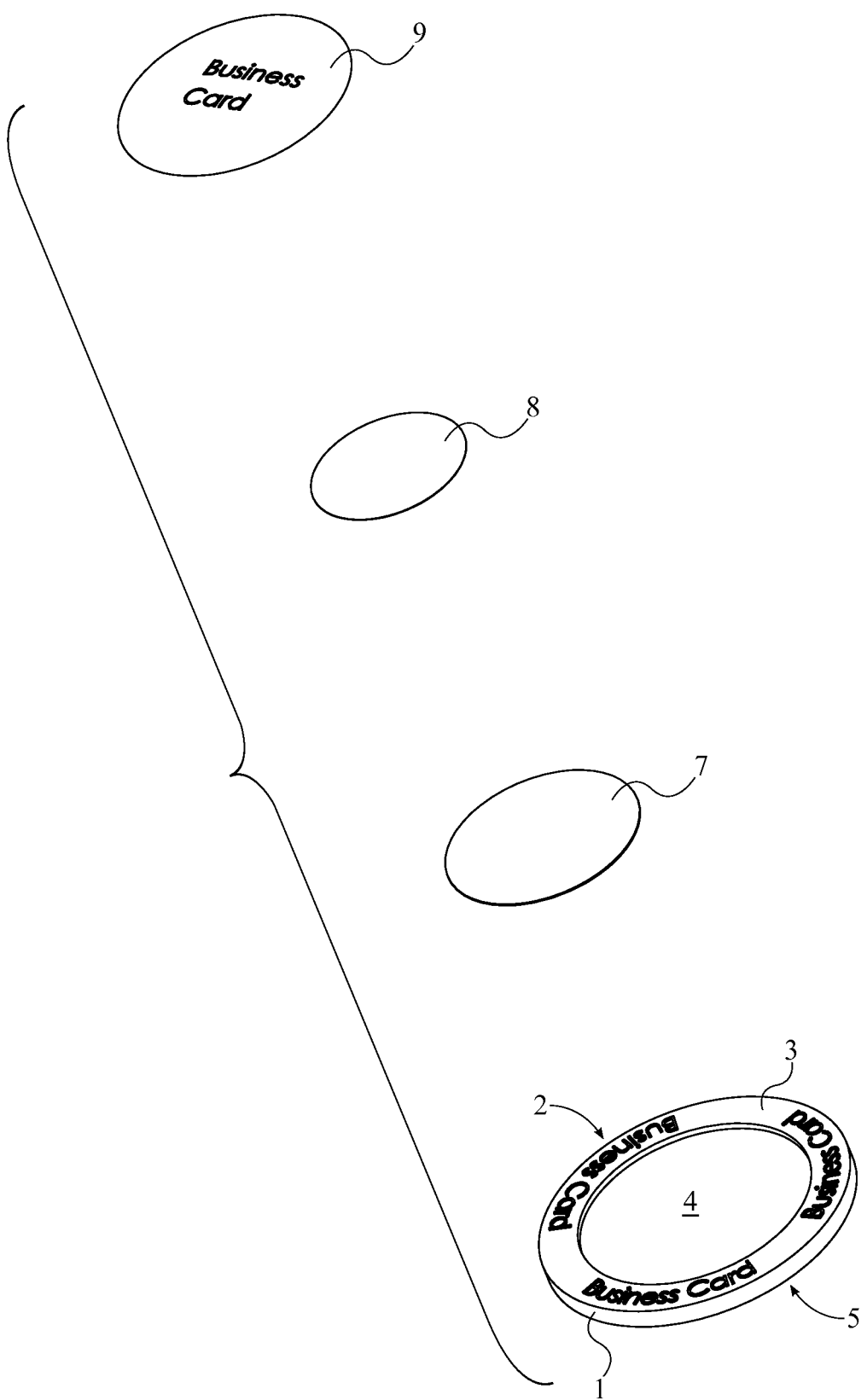
FIG. 3 is a top perspective view of the present invention in an exploded configuration.
Figure 4:
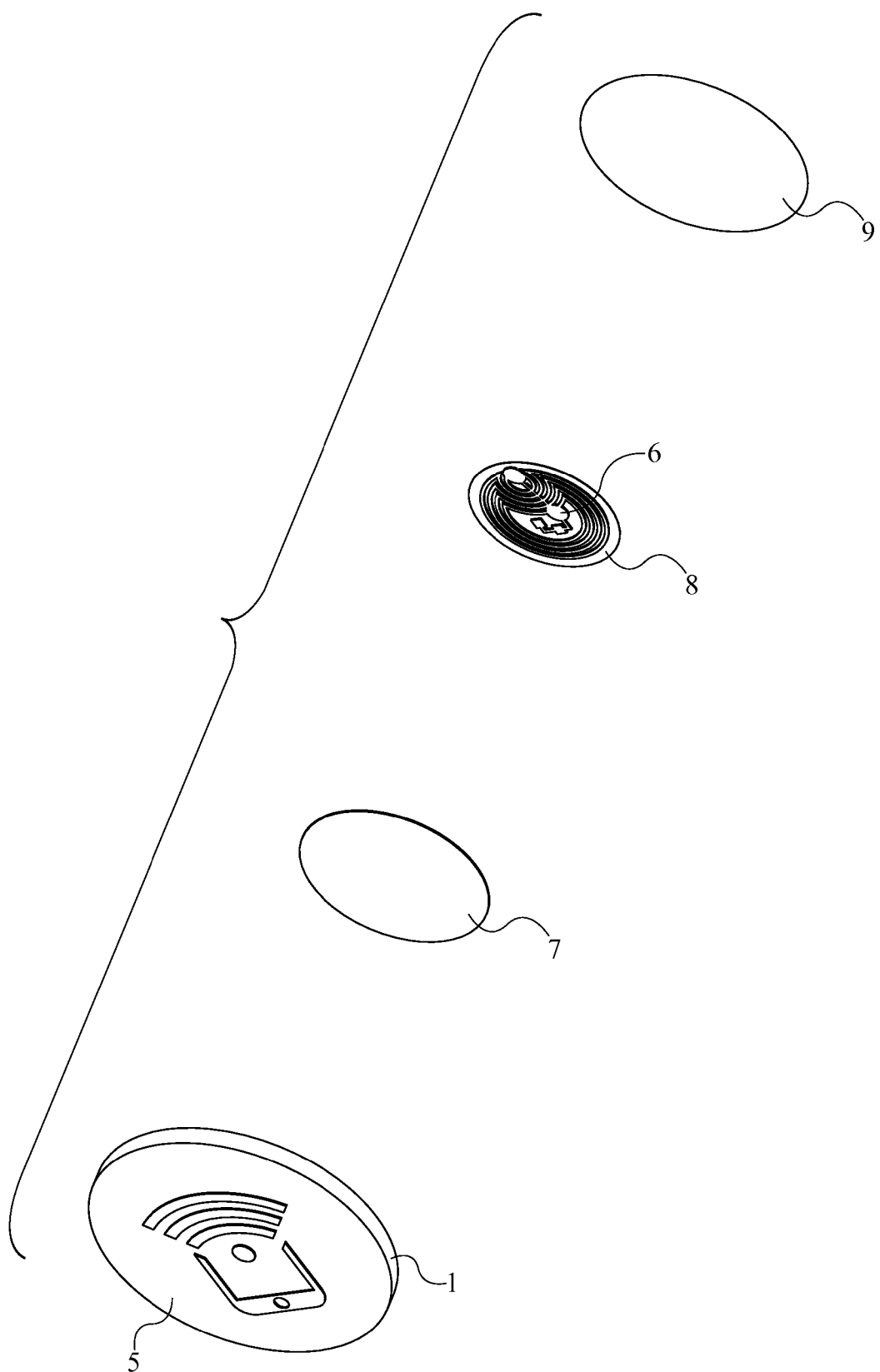
FIG. 4 is a bottom perspective view of the present invention in an exploded configuration.

As can be seen in FIGS. 1 and 2, the present invention is a coin that is capable of transferring digital information to another electronic device. The present invention would typically be used to digitally store promotional information that can be readily transferred to another electronic device. The physical appearance of the present invention should relate to the promotional information as well. The present invention mainly comprises a metal planar body 1, a near field communication (NFC) chip 6, and a vinyl sticker 9, which are shown in FIGS. 3 and 4. The metal planar body 1 resembles a typical coin with a disc shape and is aesthetically designed to relate to the digital information being stored on the present invention. The NFC chip 6 is used to establish radio communication with a host electronic device that is also NFC-enabled such as a smart-phone, a tablet personal computer, or a laptop. The NFC chip 6 does not require a portable power source because the NFC chip 6 is capable of drawing power from the host electronic device. The NFC chip 6 can also be used to send commands to the host electronic device such as storing contact information, opening a particular webpage, or playing a specific sound. The NFC chip 6 can be, but is not limited to, a 144 byte chip or a one kilobyte chip. In the preferred embodiment, the present invention is used as a kind of business card, and the NFC chip 6 is used to store business contact information. In addition, the vinyl sticker 9 is used to enclose the NFC chip 6 within a recessed well 4 of the metal planar body 1. The vinyl sticker 9 allows the NFC chip 6 to properly function and communicate with the host electronic device while still enclosing the NFC chip 6 within the metal planar body 1.

Figure 5:
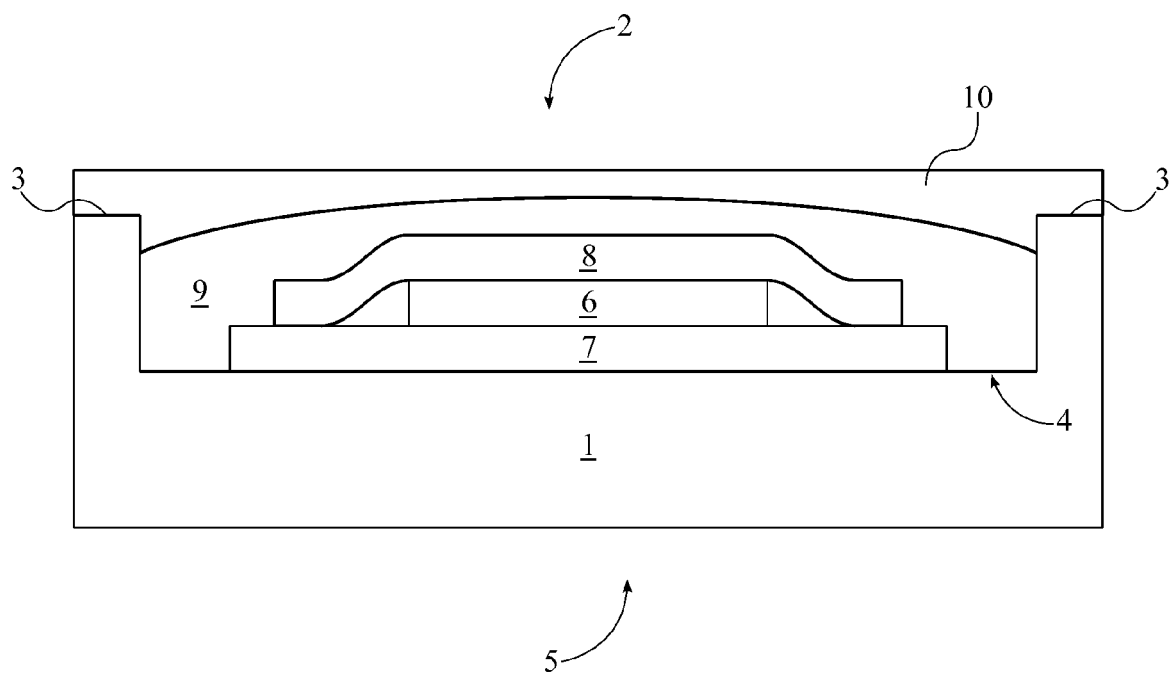
FIG. 5 is a schematic cross-section view of the present invention.

The metal planar body 1 is used as a base to connect all the other components of the present invention and has a disc shape. The metal planar body 1 comprises a first side 2 and a second side 5, which are the flat portions of the metal planar body 1 and are positioned opposite to each other through the metal planar body 1. In the preferred method of manufacturing the present invention, the metal planar body 1 is die-struck by two molds, one for the first side 2 and another of the second side 5. The first side 2 comprises an annular surface 3 and a recessed well 4. The recessed well 4 is a space that traverses into the first side 2 of the metal planar body 1. The NFC chip 6 is mounted within the recessed well 4. Moreover, the recessed well 4 is centrally positioned on the first side 2 so that the annular surface 3 has a consistent radial width, which allows the present invention to have a more symmetric appearance. Thus, the annular surface 3 encircles the recessed well 4 and is marked with engravings or other graphics that relate to the digital information on the NFC chip 6. As can be seen in FIG. 5, an epoxy finish 10 is layered onto both the annular surface 3 and the vinyl sticker 9, which is used to further protect the exterior of the present invention from physical damage.

An insulative pad 7 is a kind of shielding that is used to prevent the NFC chip 6 from short-circuiting by coming in contact with the metal planar body 1. If the NFC chip 6 were to touch the metal planar body 1, then the NFC chip 6 would not be able to properly function. The first insulative pad 7 can be made of, but is not limited to, foam or rubber. The insulative pad 7 is positioned in between the recessed well 4 and the NFC chip 6, which prevents the NFC chip 6 from touching the metal planar body 1. The insulative pad 7 is also adhered to the recessed well 4 so that the insulative pad 7 is properly situated on the recessed well 4.

An attachment tag 8 allows the present invention to situate the NFC chip 6. The attachment tag 8 is positioned in between the NFC chip 6 and the vinyl sticker 9 so that the vinyl sticker 9 does not directly adhere to the NFC chip 6. The attachment tag 8 is centrally adhered onto the NFC chip 6 and is peripherally adhered onto the insulative pad 7, which secures the NFC chip 6 to the insulative pad 7. In the preferred embodiment of the present invention, the insulative pad 7 and the attachment tag 8 are combined with the NFC chip 6 as one manufactured part.

The vinyl sticker 9 is the means to mount the NFC chip 6 to the metal planar body 1 without inhibiting its ability to transmit digital information to the host electronic device through radio communication. Thus, the vinyl sticker 9 is centrally adhered onto both the insulative pad 7 and the attachment tag 8 and is peripherally adhered onto the recessed well 4, which secures and situates the vinyl sticker 9 into the recessed well 4.

The present invention can be implemented in a variety of ways. One way is for a football team to sell a commemorative embodiment of the present invention, which would allow user of the present invention to access exclusive team-related content that is only available through the present invention. Another way is to change the data on the server side so that the present invention would contain the same link and only the content for the link would change on the server side. Another way is to have the host electronic device be a smart-phone, and the present invention could call a phone number or link to a map location for a secret party or event.

Although the invention has been explained in relation to its preferred embodiment, it is to be understood that many other possible modifications and variations can be made without departing from the spirit and scope of the invention as hereinafter claimed.

What is claimed is:

1. A digital information transferring coin comprises:
   a metal planar body;
   a near field communication (NFC) chip;
   a vinyl sticker;
   said metal planar body comprises a first side and a second side;
   said first side comprises an annular surface and a recessed well;
   said second side comprises a decorated surface;
   said first side and second side being positioned opposite to each other through said metal planar body;
   said NFC chip being mounted within said recessed well; and
   said vinyl sticker enclosing said NFC chip within said recessed well.

2. The digital information transferring coin as claimed in claim 1 comprises:
   an epoxy finish;
   said recessed well being centrally positioned on said first side;
   said annular surface encircling said recessed well; and
   said epoxy finish being layered onto both said annular surface and said vinyl sticker.

3. The digital information transferring coin as claimed in claim 1 comprises:
   an insulative pad;
   said insulative pad being positioned in between said recessed well and said NFC chip; and
   said insulative pad being adhered onto said recessed well.

4. The digital information transferring coin as claimed in claim 1 comprises:
   an attachment tag;
   said attachment tag being positioned in between said NFC chip and said vinyl sticker;
   said attachment tag being centrally adhered onto said NFC chip; and
   said attachment tag being peripherally adhered onto an insulative pad.

5. The digital information transferring coin as claimed in claim 1 comprises:
   said vinyl sticker being centrally adhered onto an insulative pad and an attachment tag; and
   said vinyl sticker being peripherally adhered onto said recessed well.

6. A digital information transferring coin comprises:
   a metal planar body;
   a near field communication (NFC) chip;
   a vinyl sticker;
   an insulative pad;
   said metal planar body comprises a first side and a second side;
   said first side comprises an annular surface and a recessed well;
   said second side comprises a decorated surface;
   said first side and second side being positioned opposite to each other through said metal planar body;
   said NFC chip being mounted within said recessed well;
   said vinyl sticker enclosing said NFC chip within said recessed well;
   said insulative pad being positioned in between said recessed well and said NFC chip; and
   said insulative pad being adhered onto said recessed well.

7. The digital information transferring coin as claimed in claim 6 comprises:
   an epoxy finish;
   said recessed well being centrally positioned on said first side;
   said annular surface encircling said recessed well; and
   said epoxy finish being layered onto both said annular surface and said vinyl sticker.

8. The digital information transferring coin as claimed in claim 6 comprises:
   an attachment tag;
   said attachment tag being positioned in between said NFC chip and said vinyl sticker;
   said attachment tag being centrally adhered onto said NFC chip;
   said attachment tag being peripherally adhered onto said insulative pad;
   said vinyl sticker being centrally adhered onto said insulative pad and said attachment tag; and
   said vinyl sticker being peripherally adhered onto said recessed well.

9. A digital information transferring coin comprises:
   a metal planar body;
   a near field communication (NFC) chip;
   a vinyl sticker;
   an insulative pad;
   an epoxy finish;
   said metal planar body comprises a first side and a second side;
   said first side comprises an annular surface and a recessed well;
   said second side comprises a decorated surface;
   said first side and second side being positioned opposite to each other through said metal planar body;
   said NFC chip being mounted within said recessed well;
   said vinyl sticker enclosing said NFC chip within said recessed well;
   said recessed well being centrally positioned on said first side;
   said annular surface encircling said recessed well;
   said epoxy finish being layered onto both said annular surface and said vinyl sticker;
   said insulative pad being positioned in between said recessed well and said NFC chip; and
   said insulative pad being adhered onto said recessed well.

10. The digital information transferring coin as claimed in claim 9 comprises:
    an attachment tag;
    said attachment tag being positioned in between said NFC chip and said vinyl sticker;
    said attachment tag being centrally adhered onto said NFC chip; and said attachment tag being peripherally adhered onto said insulative pad.

11. The digital information transferring coin as claimed in claim 9 comprises:
said vinyl sticker being centrally adhered onto said insulative pad and an attachment tag; and
said vinyl sticker being peripherally adhered onto said recessed well.

* * * * *